United States Patent Office 3,094,465
Patented June 18, 1963

3,094,465
METHOD FOR HYDROLYZING STEROID-ESTERS
Masamoto Nishikawa, Nishinomiya, and Shunsaku Noguchi, Minoo, Osaka, Japan, assignors to Takeda Pharmaceutical Industries, Ltd., Osaka, Japan
No Drawing. Filed Oct. 20, 1960, Ser. No. 63,719
Claims priority, application Japan Oct. 24, 1959
15 Claims. (Cl. 195—51)

This invention relates to a novel and useful method for hydrolyzing a kind of steroid-esters by employing an enzyme preparation derived from organs of animals, microorganisms, plants, etc., all of which contain so-called digestive enzymes.

In microbiological oxidation reactions on steroids which have recently come to be in fluorish, especially in an oxidation reaction where an acyloxysteroid is employed as the starting steroid, hydrolysis of the esters employed is sometimes accompanied by oxidation to give a free hydroxy- or oxo-steroid. [See, for example, S. H. Eppstein et al.: J. Am. Chem. Soc., vol. 75, p. 408 (1953).] On the other hand, there have been reported very small number of examples of microbiological reactions particularly directed to the hydrolysis of certain specific steroid-esters. [W. Charney et al., Arch. Biochem. Biophys., vol. 79, p. 402 (1959).]

However, studies on hydrolysis of steroid-esters with the aid of extracted enzyme-containing preparations, but not with the aid of microbiological processes as mentioned above, have not yet been fully developed.

As a result of the present inventors' researches, it was found that a kind of enzyme-containing preparations shows an activity to hydrolyze steroid-esters which have ester group or groups, i.e. acyloxy group or groups, at specific position or positions, and further studies on many features of the problem have now made it clear that the new process for hydrolyzing steroid-esters utilizing the activity of the enzyme-containing preparations is of high value for practical and industrial purposes.

The present process is applicable to those steroid-esters, the skeleton of which is constructed with carbon atoms in an optional number up to 21 and has one lower aliphatic acyloxy group at one or more of the positions 16, 17, 20, and 21. The term "steroidal carbon skeleton" as used in this specification is confined to the steroidal skeleton composed of the four rings A, B, C, and D—each of which may take its form as normal, homo- or nor—that having an angular methyl at 10- and 13-positions, and that having a side-chain containing one or two carbon atoms at 17-position, but the angular methyl at 10-position and/or the side-chain at 17-position may not be present. Of the steroid esters used in the process of this invention, the most important ones are those having the same skeleton as androstane or pregnane. The aliphatic acid acyloxy group may be substituted for by hydroxy, amino, a lower alkylamino, a di-lower alkylamino, carboxy group or a halogen as to be mentioned below. The skeleton of the steroid-ester may have such substituents as hydroxy, oxo, an alkoxy, an acyloxy, an alkyl, chloro, bromo, fluoro, epoxy, an alkylenedioxy, etc. at whichever of the positions; and may have one or more double bonds in any of the rings A, B, C, and D. All of these steroid-esters usable in this process are known and preparable in the manner as prevailing in the field of steroid chemistry.

As the enzyme preparation to be used in this process there may be employed so-called digestive enzyme or enzymes known as amylase (=diastase) or pancreatin, etc. which are derived from such an enzyme source as radish, fungi of the genus Aspergillus, sprout of such plant as wheat, barley (malt), rice, beans, etc., pancreas of pig, cattle, etc. The enzyme-containing preparation suitable for this process is, for example, prepared from the enzyme sources, as follows; an enzyme source is grated or minced, then extracted with water or alcohol-containing water, and the enzyme fraction is precipitated in the extract solution by adding alcohol or ammonium sulfate, etc., separated from the liquid portion, and then dried. The present inventors have found it convenient to use commercial digestive enzyme preparations of the so-called diastase or pancreatin now marketed under various trade names such as "Diastase," "Takadiastase" (Sankyo Co., Ltd., Japan), "Protamilase" (Teikoku Hormone Mfg. Co., Ltd.), etc.

Generally, the hydrolysis reaction in the present invention is conveniently and smoothly effected by bringing the above-mentioned starting steroid-ester into contact with the said enzyme or enzyme preparation in an aqueous medium under around room temperature, and, during the reaction, the medium may be agitated or shaken. The aqueous medium may be water itself. Even if the starting steroid-ester may not be freely soluble in water, they may be employed in a state of suspension in the present process. However, if it is desired to keep the starting steroid-ester dissolved in the aqueous medium, there may be added to the medium such hydrophilic, organic solvent or solvents as methanol, ethanol, t-butanol, acetone, etc.

The reaction temperature can be selected from $-5$ to $60°$ C., a temperature at which the enzyme employed can show its activity; however, it is desirable that the reaction is effected at a suitable temperature for the enzyme to exhibit its activity. Generally, the reaction can smoothly proceed at a room temperature from about 20 to $25°$ C., so that it is usually unnecessary to adjust the reaction temperature. This fact also provides, in a technical sense, one of the predominances of the present process over the hitherto used processes.

It is also unnecessary to adjust the pH of the reaction medium, for example, by the use of a buffer solution as in a usual enzymic reaction; because the enzyme preparation used in the present process has in itself a buffer action and a desirable pH is obtained only by dissolving or suspending the enzyme preparation in the aqueous medium. A desirable pH of the reaction medium is about 5.0 to 9.0, though there are more or less differences in the optimum pH in accordance with the kinds of the enzyme preparation. Of course, even if the use of a buffer solution as the reaction medium is desired, the use of such a buffer as Clark-Lubs's Sörensen's, Kolthoff's, Michaelis's or other buffer solution does not inhibit the process of the reaction, though it may become more or less troublesome to isolate the objective steroid from the reaction mixture.

The desirable reaction period is inevitably varied in accordance with such other conditions as the kind and amount of the employed enzyme preparation, those of the starting steroid ester, the composition and acidity of the reaction medium, the reaction temperature, etc., so that it should be selected when the reaction is practically effected. Broadly speaking, reaction period is inversely proportional to the amount of enzyme preparation employed.

The objective steroid thus produced and accumulated in the reaction medium can easily be isolated in the manner as usually employed to isolate and recover steroidal substances.

There are two specificities in this hydrolysis process, i.e. the positions where the hydrolysis can take place and the kind of acyloxy group which is hydrolyzable in the substrate.

In the first place, the acyloxy group or groups in the restricted positions, i.e. 16- and 17-positions of the substrates and further 20- and 21-positions of those belonging to the pregnane series, can be far more quickly hydrolyzed than those of the other positions such as 3, 6, 11, 15, and 19 under quite mild conditions; so that the process of the present invention is substantially specific hydrolysis of the acyloxy group or groups at the restricted positions:

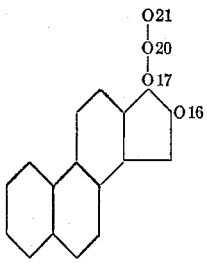

O: Position of the hydrolyzable acyloxy group

From the Table I, wherein some examples of the starting steroid-esters and the positions of the acyloxy groups to be hydrolyzed in the present process are shown, the specificity of the hydrolysis on the positions will be observed.

TABLE I.—ENZYMATIC HYDROLYSIS OF STEROIDAL ACYLATES

| Exp. No. | Substrate | Positions of the acyloxy groups in substrate | Positions of the acyloxy groups hydrolyzed |
|---|---|---|---|
| 1 | 1β, 2β, 3α-Trihydroxypregn-16-en-20-one triacetate. | 1, 2, 3 | N. R. |
| 2 | 3β-Hydroxypregna-5, 16-dien-20-one acetate. | 3 | N. R. |
| 3 | 11β - Hydroxyandrost 4 ene 3, 17 - dione acetate. | 11 | N. R. |
| 4 | 17β - Hydroxyandrost 4 en - 3 - one acetate. | 17 | 17 |
| 5 | 3β, 21 - Dihydroxypregn - 5 - en - 20 - one 21-monoacetate. | 21 | 21 |
| 6 | 16β, 17β - Epoxy - 21 - hydroxypregn - 4-ene-3,20-dione acetate. | 21 | 21 |
| 7 | 21 - Hydroxypregn - 4 - ene - 3, 20 - dione acetate. | 21 | 21 |
| 8 | 17α, 21 - Dihydroxypregn - 4 - ene - 3, 20 - dione (Reichstein's substance S) acetate. | 21 | 21 |
| 9 | 17α, 21 - Dihydroxypregn - 4 - ene - 3, 11, 20 - trione (cortisone) acetate. | 21 | 21 |
| 10 | 11β, 17α, 21 - Trihydroxypregn - 4 - ene - 3, 20 - dione (hydrocortisone) acetate. | 21 | 21 |
| 11 | 9α - Fluoro - 11β, 17α, 21 - trihydroxypregn - 4 - ene - 3, 20 - dione acetate. | 21 | 21 |
| 12 | 11β, 17α, 21 - Trihydroxypregna - 1, 4-diene - 3, 20 - dione (prednisolone) acetate. | 21 | 21 |
| 13 | 16α, 21 - Dihydroxypregn 4 ene - 3, 20 - dione 21 - monoacetate. | 21 | 21 |
| 14 | 16α, 21 - Dihydroxypregn 4 ene - 3, 20 - dione diacetate. | 16, 21 | 16, 21 |
| 15 | 6β, 17α, 21 - Trihydroxypregn - 4 - ene-3,20-dione diacetate. | 6, 21 | 21 |
| 16 | 11α, 17α, 21 - Trihydroxypregn - 4 -; ene-3,20-dione diacetate. | 11, 21 | 21 |
| 17 | 15α, 17α, 21 - Trihydroxypregn - 4 - ene-3,20-dione diacetate. | 15, 21 | 21 |
| 18 | 16β, 17α, 21 - Trihydroxypregn - 4 - ene-3,20-dione diacetate. | 16, 21 | ¹21 |
| 19 | do | 16, 21 | 16, 21 |
| 20 | 17α, 19, 21 - Trihydroxypregn - 4 - ene-3, 20-dione diacetate. | 19, 21 | 21 |
| 21 | 17α, 20α, 21-Trihydroxypregn-4-en-3-one diacetate. | 20, 21 | 20, 21 |
| 22 | 11β, 17α, 20β, 21 - Tetrahydroxypregn-4-en-3-one diacetate. | 20, 21 | 20, 21 |
| 23 | 16α, 17α - Epoxy - 3β - hydroxypregn-5-en-20-one formate. | 3 | N. R. |

N. R.: No reaction.
¹ The position hydrolyzed in the early stage of the reaction.

In the second place, there are remarkable differences among a variety of acyloxy groups in the reaction velocity of hydrolysis. More concretely stated so-called acyloxy groups can be divided into two classes in accordance with their substantial behaviors in this process; one class to be hydrolyzable and the other class to be practically not hydrolyzable. Table II shows aliphatic acid acyloxy groups having a straight chain of one to around ten carbon atoms such as formyloxy, acetoxy, propionoyloxy, butyroyloxy, capryloyloxy, etc. When the straight carbon chain of the acyloxy group is further restricted to the chain having carbon atoms lower than 5, the above mentioned lower aliphatic acyloxy groups may have as their substituents hydroxyl, amino, lower alkylamino, lower dialkylamino, halogen, carboxy, etc.

TABLE II.—ENZYMATIC HYDROLYSIS OF STEROIDAL ESTERS (A) ESTERS HYDROLYZED

| Exp. No. | Substrate esters | | |
|---|---|---|---|
| | Steroidal alcohol | Ester group | Position of the ester group |
| 1 | 17β-Hydroxyandrost-4-en-3-one | formate | 17 |
| 2 | 17α,21-Dihydroxypregn-4-ene-3,20-dione. | do | 21 |
| 3 | 11β,17α,21-Trihydroxypregn-4-ene-3,20-dione. | succinate | 21 |
| 4 | 11β,17α,21-Trihydroxypregna-1,4-diene-3,20-dione. | butyrate | 21 |
| 5 | do | caprylate | 21 |
| 6 | do | N,N-dimethyl-aminoacetate. | 21 |
| 7 | do | N,N-diethyl-aminoacetate. | 21 |
| 8 | do | succinate | 21 |
| 9 | do | tartrate | 21 |

(B) ESTERS UNHYDROLYZED

| | | | |
|---|---|---|---|
| 10 | 17α,21-Dihydroxypregn-4-ene-3,20-dione (Reichstein's substance S) | benzoate | 21 |
| 11 | 11β,17α,21-Trihydroxypregn-4-ene-3,20-dione (hydrocortisone). | adipate | 21 |
| 12 | 11β,17α,21-Trihydroxypregna-1,4-diene-3,20-dione (prednisolone). | trimethylacetate | 21 |
| 13 | do | isoketopinate | 21 |
| 14 | do | p-aminobenzoate | 21 |
| 15 | do | adipate | 21 |

The process of the present invention has several remarkable predominances over the hitherto-employed processes, which are as follows:

(1) In the present method there is realized partial hydrolysis, which has been extremely difficult or impossible by the hitherto-employed methods in which is used an acid or an alkali, by utilizing the differences in reaction velocity of the specified positions from the other positions and of the kind of acyloxy group or groups. For example, as shown in Table I, there are obtainable with good yield through the present process 6β,17α,21-trihydroxypregn-4-ene-3,20-dione 6-monoacetate from its 6,21-diacetate, 11α,17α,21 - trihydroxypregn-4-ene-3,20-dione 11-monoacetate from its 11,21-diacetate, 15α,17α,21-trihydroxypregn-4-ene-3,20-dione 15-monoacetate from its 15,21-diacetate, 17α,19,21-trihydroxypregn-4-ene-3,20-dione 19-monoacetate from its 19,21-diacetate, respectively; those products have never been obtained with good yield through the hitherto-employed processes.

(2) The mild conditions in the present process make it possible to apply the process without side reaction to those steroids which have a group or groups being susceptible to the action of acid or alkali, and the reaction so-provoked is restricted to hydrolysis of the acyloxy group or groups at the specific positions. For example, 16β,17α, 21-trihydroxypregn-4-ene-3,20-dione 16,21-diacetate is hydrolyzed through the present process to give the corresponding 16β-monoacetate in an earlier stage and finally 16β,17α,21-trihydroxypregn-4-ene-3,20-dione, and, during the reaction there never occurs the isomerization to 16α, 17α,21 - trihydroxypregn - 4 - ene-3,20-dione which takes place in hydrolysis with alkali [cf. S. Bernstein, et al.: J. Am. Chem. Soc., vol. 81, p. 1256 (1959)].

(3) The third predominance of the present method is mainly directed to comparison with the reported microbiological hydrolysis of steroid-esters, wherein a culture of living microorganisms is employed. In the microbiological hydrolysis, there is required exposure of both starting and objective steroids to various enzymes and enzyme-systems of the living microorganisms used in the broth. As these enzymes or enzyme-systems have different activities with one another, when the above hydrolysis is carried out, unexpected reaction may possibly be accompanied such as oxygenation, dehydrogenation, hydrogenation, splitting off of the side chain, ring disclosure of the steroid skeleton, and therefore to effect the desired hydrolysis specifically is of difficulty. Moreover, isolation of a desired product is troublesome, because in the reaction mixture there co-exist many extra substances required for the microorganisms employed and produced by them and, in many cases, undesired steroidal products.

It is now possible by the process of the present invention to diminish or to obviate the shortcomings of the hitherto-employed microbiolgical hydrolysis or steroid-esters.

As afore-mentioned, the present hydrolysis process of the steroid-ester is characterized especially in its specificity of the positions at which the acyloxy group or groups are hydrolyzed under quite mild conditions. The following are practical examples of new synthetic courses in which the hydrolysis process of the present invention is incorporated as a necessary step:

(A) $17\alpha,19$ (or $11\alpha$, or $15\alpha$), $21$-trihydroxypregn-4-ene-3,20-dione was acetylated to give 19 (or $11\alpha$, or $15\alpha$), $21$-diacetoxy-$17\alpha$-hydroxypregn-4-ene-3,20-dione, and the diacetate is submitted to the hydrolysis process of the present invention to give 19 (or $11\alpha$, or $15\alpha$)-acetoxy-$17\alpha,21$ - dihydroxypregn-4-ene-3,20-dione. The so-obtained 19 (or $11\alpha$, or $15\alpha$)-monoacetate is treated with tosyl chloride in dimethylformamide to give 19 (or $11\alpha$, or $15\alpha$)-acetoxy-21-chloro-$17\alpha$-hydroxypregn-4-ene-3,20-dione, and then the 21-chloride is treated with sodium iodide in acetic acid to produce 19 (or $11\alpha$, or $15\alpha$)-$17\alpha$-hydroxypregn-4-ene-3,20-dione, which can be hydrolyzed by a usual means to recover the 19 (or $11\alpha$, or $15\alpha$)-hydroxy group. The yield in each step of the above-mentioned courses is very good. Thus, the 21-dehydroxy compound corresponding to the starting 21-hydroxy compound can be obtained with good yield.

The 21-dehydroxy-19-hydroxy steroid thus obtained can further be changed into $17\alpha$-hydroxy-19-norpregn-4-ene-3,20-dione through two steps, namely, by oxidizing with chromic acid-sulfuric acid in acetone and then reacting with an alkali.

(B) $16\beta,21$ - diacetoxy - $17\alpha$ - hydroxypregn - 4 - ene-3,20-dione which can be prepared from 21-acetoxy-$16\alpha$, $17\alpha$-epoxypregn-4-ene-3,20-dione by treating the latter with sulfuric acid and acetic acid (K. Heusler, A. Wettstein: Chem. Ber., vol. 87, p. 1301 (1954)), is submitted to the hydrolysis process of the present invention to give at first $16\beta$-acetoxy-$17\alpha,21$-dihydroxypregn-4-ene-3,20-dione (I), and then, the reaction is allowed to continue to give $16\beta,17\alpha,21$-trihydroxypregn-4-ene-3,20-dione (II). The compound (II) has not been hitherto synthesized, because such a $16\beta,17\alpha$-dihydroxy-20-oxosteroid is so labile that it has been isomerized to its $16\alpha$-isomer (refer to the above (2) describing the predominances of the present process). The so-obtained product (II) is treated with sodium bismuthate to yield $16\beta$-acetoxyandrost-4-ene-3,17-dione. The resulting C$_{19}$-steroid can be subsequently rearranged with sulfuric acid in methanol to give 16-oxotestosterone, i.e. $17\beta$-hydroxyandrost-4-ene-3,16-dione.

It will be obvious for any of the skilled in the art who have understood the present invention that the above examples of the new synthetic courses are only a few of many possible courses wherein the hydrolysis process of the present invention is applicable, and that it has become possible for them to develop new synthetic fields by the accomplishment of the present invention.

The following examples represent presently-preferred illustrative embodiments of the present invention, however, these are not at all limitative of the invention. In these examples, parts by weight bear the same relationship to parts by volume as do grams to cubic centimeters, and all temperatures are uncorrected.

*Example 1*

To a solution of 0.2 part by weight of $16\alpha,21$-dihydroxypregn-4-ene-3,20-dione 16,21-diacetate in 100 parts by volume of ethanol is added a solution of 10 parts by weight of diastase (Japanese Pharmacopoeia VI) in 500 parts by volume of water, and the mixture is allowed to stand for 40 hours at a room temperature. Then the mixture is extracted three times with ethyl acetate. The combined ethyl acetate layers are washed three times with water, and concentrated to give 0.14 part by weight of crystals of $16\alpha,21$-dihydroxypregn-4-ene-3,20-dione, melting at 198–200° C. Upon recrystallization from ethyl acetate, the crystals show the following characteristics:

Melting point: 200–202° C.,
Specific rotation: $[\alpha]_D^{22}$ +118° (in ethanol),
Ultraviolet absorption:

$$\lambda_{max.}^{EtOH} \ 241 \ m\mu \ (\epsilon=16,000)$$

*Analysis.*—Calcd. for $C_{21}H_{30}O_4$: C, 72.80; H, 8.73. Found: C, 72.91; H, 8.77.

*Example 2*

A solution of 10 parts by weight of diastase (Japanese Pharmacopoeia VI) in 500 parts by volume of water is added to a solution of 0.2 part by weight of $16\alpha,21$-dihydroxypregn-4-ene-3,20-dione 21-monoacetate in 100 parts by volume of ethanol, and the mixture is allowed to stand for 40 hours at a room temperature. Then, the mixture is treated in the same manner as in Example 1 to give crystals of $16\alpha,21$-dihydroxypregn-4-ene-3,20-dione with a nearly quantitative yield.

*Example 3*

To a solution of 0.2 part by weight of $11\beta,17\alpha,21$-trihydroxypregn-4-ene-3,20-dione 21-acetate (hydrocortison acetate) in 200 parts by volume of methanol is added a solution of 15 parts by weight of "Protamilase" (a digestive enzyme preparation, extracted from pig pancreas, being now produced by Teikoku Hormone Mfg. Co., Ltd., and sold by Takeda Pharmaceutical Ind., Ltd., Japan) in 400 parts by volume of water, and the mixture is allowed to stand for 5 days at a room temperature. Then, the mixture is extracted with ethyl acetate. After being washed with water, the mixture is dehydrated and concentrated to dryness to give $11\beta,17\alpha,21$-trihydroxypregn-4-ene-3,20-dione with a quantitative yield.

*Example 4*

A solution of 5 parts by weight of concentrated diastase (a crude diastase not yield diluted to the standard of Japanese Pharmacopoeia; produced by Matsumura Seiyakusho) in 400 parts by volume of water is added to a solution of 0.2 part by weight of $17\beta$-hydroxyandrost-4-en-3-one formate (testosterone formate) in 200 parts by volume of methanol, and the mixture is shaken for 7 days at a room temperature. Then, the mixture is extracted with ethyl acetate. After being washed with water, the ethyl acetate solution is dehydrated and concentrated to dryness to give $17\beta$-hydroxyandrost-4-en-3-one (testosterone).

*Example 5*

To a solution of 0.2 part by weight of $11\alpha,17\alpha,21$-trihydroxypregn-4-ene-3,20-dione 11,21-diacetate in 100 parts by volume of ethanol is added a solution of 10 parts by weight of diastase (Japanese Pharmacopoeia VI) in 500 parts by volume of water, and the mixture is allowed to stand for 40 hours at a room temperature. Then, the mixture is treated in the same manner as in Example 1 to give crystals of 11α,17α,21-trihydroxypregn-4-ene-3,20-dione 11-monoacetate with a nearly quantitative yield. Further recrystallization of the product from methylenechloride-benzene gives the following characteristics:

Melting point: 213–215° C.,
Ultraviolet absorption:

$$\lambda_{max.}^{EtOH} \ 239 \ m\mu \ (\epsilon=15,600)$$

*Analysis.*—Calcd. for $C_{23}H_{30}O_6$: C, 68.29; H, 7.97. Found: C, 68.52; H, 7.91.

*Example 6*

A solution of 50 parts by weight of diastase (Japanese Pharmacopoeia VI) in 2,500 parts by volume of water is added to a solution of 1 part by weight of 15α,17α,21-trihydroxypregn-4-ene-3,20-dione 15,21-diacetate in 500 parts by volume of ethanol and the mixture is allowed to stand for 40 hours at a room temperature. Then, the mixture is treated in the same manner as in Example 1 to obtain crystals of 15α,17α,21-trihydroxypregn-4-ene-3,20-dione 15-monoacetate with a nearly quantitative yield. Upon recrystallization from acetone-ether, the crystals show the following characteristics:

Melting point: 211–214° C. (decomp.),
Specific rotation: $[\alpha]_D^{22}$ +137° (in chloroform),
*Analysis.*—Calcd. for $C_{23}H_{32}O_6$: C, 68.29; H, 7.97. Found: C, 68.12; H, 8.00.

*Example 7*

To a solution of 1 part by weight of 17α,19,21-trihydroxypregn-4-ene-3,20-dione 19,21-diacetate in 500 parts by volume of ethanol is added a solution of 50 parts by weight of diastase (Japanese Pharmacopoeia VI) in 2,500 parts by volume of water and the mixture is allowed to stand for 40 hours at a room temperature. Then, the mixture is treated with ethyl acetate in the same manner as in Example 1 to give 0.8 part by weight of crystals of 17α,19,21-trihydroxypregn-4-ene-3,20-dione 19-monoacetate, melting at 180–185° C. Upon recrystallization from acetone-ether, the crystals show the following characteristics:

Melting point: 185–186° C.,
Specific rotation: $[\alpha]_D^{23}$ +145° (in chloroform),
Ultraviolet absorption:

$$\lambda_{max.}^{EtOH} \ 238 \ m\mu \ (\epsilon=17,000)$$

*Analysis.*—Calcd. for $C_{23}H_{32}O_6$: C, 68.29; H, 7.97. Found: C, 67.94; H, 7.94.

*Example 8*

To a solution of 1 part by weight of 16β,17α,21-trihydroxypregn-4-ene-3,20-dione 16,21-diacetate in 500 parts by volume of methanol is added a solution of 50 parts by weight of diastase (Japanese Pharmacopoeia VI) in 2,500 parts by volume of water and the mixture is allowed to stand for 20 hours at a room temperature. Then, the mixture is extracted with ethyl acetate and treated in the same manner as in Example 1 to obtain 0.75 part by weight of 16β,17α,21-trihydroxypregn-4-ene-3,20-dione 16-monoacetate. The so-obtained material is recrystallized from methylenechloride-ether to give the crystals which show the following characteristics:

Melting point: 188–190° C.,
Specific rotation: $[\alpha]_D^{21}$ +104° (in chloroform),
Ultraviolet absorption:

$$\lambda_{max.}^{EtOH} \ 240 \ m\mu \ (\epsilon=15,000)$$

*Analysis.*—Calcd. for $C_{23}H_{36}O_6$: C, 68.29; H, 7.97. Found: C, 68.61; H, 7.92.

*Example 9*

A solution of 50 parts by weight of "Takadiastase" (a digestive enzyme preparation; an enzyme preparation derived from fungus of Aspergillus; produced and sold by Sankyo Co., Ltd., Japan) in 2,500 parts by volume of water is added to a solution of 1 part by weight of 16β,17α,21-trihydroxypregn-4-ene-3,20-dione 16,21-diacetate in 500 parts by volume of methanol and the mixture is allowed to stand for 12 days at a room temperature. Then, the mixture is extracted with ethyl acetate and treated in the same manner as in Example 1 to obtain 0.7 part by weight of 16β,17α,21-trihydroxypregn-4-ene-3,20-dione which melts at 185–190° C. The so-obtained material is recrystallized from acetone-benzene to give the crystals which show the following characteristics:

Melting point: 188–190° C.
Specific rotation: $[\alpha]_D^{21}$ +118 (in chloroform).
Ultraviolet absorption:

$$\lambda_{max.}^{EtOH} \ 241 \ m\mu \ (\epsilon=16,000)$$

*Analysis.*—Calcd. for $C_{21}H_{30}O_5$: C, 69.58; H, 8.34. Found: C, 69.56; H, 8.11.

In this example, diastase (Japanese Pharmacopoeia VI) is used instead of "Takadiastase" to obtain a similar result.

Having thus disclosed the invention, what is claimed is:

1. A method for hydrolyzing a steroid ester, the steroidal carbon skeleton of which is that of pregnane and which has at the 16-position an acyloxy group selected from the group consisting of alkylcarbonyloxy groups having a straight chain of one to about ten carbon atoms and of alkylcarbonyloxy groups having a chain of less than five carbon atoms and being substituted by a member selected from the group consisting of hydroxyl, amino, lower alkylamino, lower dialkylamino, halogen and carboxy, which comprises bringing the said steroid ester into contact with an enzyme selected from the group consisting of diastase, Takadiastase and Protamilase in an aqueous medium, whereby the acyloxy group at the 16-position is selectively hydrolyzed to OH even in the presence of acyloxy groups in other positions of the starting steroid ester.

2. A method for hydrolyzing a steroid ester, the steroidal carbon skeleton of which is that of pregnane and which has at the 17-position an acyloxy group selected from the group consisting of alkylcarbonyloxy groups having a straight chain of one to about ten carbon atoms and of alkylcarbonyloxy groups having a chain of less than five carbon atoms and being substituted by a member selected from the group consisting of hydroxyl, amino, lower alkylamino, lower dialkylamino, halogen and carboxy, which comprises bringing the said steroid ester into contact with an enzyme selected from the group consisting of diastase, Takadiastase and Protamilase in an aqueous medium, whereby the cyloxy group at the 17-position is selectively hydrolyzed to OH even in the presence of acyloxy groups in other positions of the starting steroid ester.

3. A method for hydrolyzing a steroid ester, the steroidal carbon skeleton of which is that of pregnane and which has at the 20-position an acyloxy group selected from the group consisting of alkylcarbonyloxy groups having a straight chain of one to about ten carbon atoms and of alkylcarbonyloxy groups having a chain of less than five carbon atoms and being substituted by a member selected from the group consisting of hydroxyl, amino, lower alkylamino, lower dialkylamino, halogen and carboxy, which comprises bringing the said steroid ester into contact with an enzyme selected from the group consisting of diastase, Takadiastase and Protamilase in an aqueous medium whereby the acyloxy group at the 20-position is selectively hydrolyzed to OH even in the presence of acyloxy groups in other positions of the starting steroid ester.

4. A method for hydrolyzing a steroid ester, the steroidal carbon skeleton of which is that of pregnane and which has at the 21-position an acyloxy group selected from the group consisting of alkylcarbonyloxy groups having a straight chain of one to about ten carbon atoms and of alkylcarbonyloxy groups having a chain of less than five carbon atoms and being substituted by a member selected from the group consisting of hydroxyl, amino, lower alkylamino, lower dialkylamino, halogen and carboxy, which comprises bringing the said steroid ester into contact with an enzyme selected from the group consisting of diastase, Takadiastase and Protamilase in an aqueous medium, whereby the acyloxy group at the 21-position is selectively hydrolyzed to OH even in the presence of acyloxy groups in other positions of the starting steroid ester.

5. A method for hydrolyzing a steroid ester, which comprises bringing a lower aliphatic acid ester of a steroid, which is a member selected from the group consisting of 3β,21-dihydroxypregn-5-en-20-one 21-acylate,
16α,17α - epoxy - 21 - hydroxypregn-4-ene-3,20-dione 21-acylate,
21-hydroxypregn-4-ene-3,20-dione 21-acylate,
17α,21-dihydroxypregn-4-ene-3,20-dione 21-acylate,
17α,21-dihydroxypregn-4-ene-3,11,20-dione 21-acylate,
11β,17α,21-trihydroxypregn-4-ene-3,20-dione 21-acylate,
9α - fluoro - 11β,17α,21-trihydroxypregn-4-ene-3,20-dione 21-acylate,
11β,17α,21 - trihydroxypregna - 1,4-diene - 3,20 - dione 21-acylate,
16α,21-dihydroxypregn-4-ene-3,20-dione 21-acylate,
6β,17α,21 - trihydroxypregn - 4 - ene - 3,20 - dione 6,21-diacylate,
15α,17α,21 - trihydroxypregn - 4-ene - 3,20 - dione 15,21-diacylate,
16β,17α,21 - trihydroxypregn - 4 - ene-3,20 - dione 16,21-diacylate,
11α,17α,21 - trihydroxypregn - 4 - ene - 3,20 - dione 11,21-diacylate,
17α,19,21 - trihydroxypregn - 4 - ene-3,20 - dione 19,21-diacylate,
17α,20α,21 - trihydroxypregn - 4 - ene - 3,20 - dione 20,21-diacylate,
11β,17α,20β,21 - tetrahydroxypregn - 4 - en-3-one 20,21-diacylate and
17β-hydroxyandrost-4-en-3-one 17-acylate into contact with an enzyme selected from the group consisting of diastase, Takadiastase and Protamilase in an aqueous medium, whereby hydrolysis is selectively effected to give the corresponding steroid alcohol selected from the group consisting of 3β,21-dihydroxypregn-5-en-20-one,
16α,17α-epoxy-21-hydroxypregn-4-ene-3,20-dione,
21-hydroxypregn-4-ene-3,20-dione,
17α,21dihydroxypregn-4-ene-3,20-dione,
17α,21-dihydroxypregn-4-ene-3,11,20-dione,
11β,17α,21-trihydroxypregn-4-ene-3,20-dione,
9α-fluoro-11β,17α,21-trihydroxypregn-4-ene-3,20-dione,
11β,17α,21-trihydroxypregna-1,4-diene-3,20-dione,
16α,21-dihydroxypregn-4-ene-3,20-dione,
6β,17α,21-trihydroxypregn-4-ene-3,20-dione 6-acylate,
15α,17α,21-trihydroxypregn-4-ene-3,20-dione 15-acylate,
16β,17α,21-trihydroxypregn-4-ene-3,20-dione,
11α,17α,21-trihydroxypregn-4-ene-3,20-dione 11-acylate,
17α,19,21-trihydroxypregn-4-ene-3,20-dione 19-acylate,
17α,20α,21-trihydroxypregn-4-ene-3,20-dione,
11β,17α,20β,21-tetrahydroxypregn-4-en-3-one and
17β-hydroxyandrost-4-en-3-one.

6. A method for hydrolyzing a steroid ester, which comprises bringing a steroid ester selected from the group consisting of 6β,17α,21-trihydroxypregn-4-ene-3,20-dione 6,21-diacetate, 11α,17α,21-trihydroxypregn-4-ene-3,20-dione 11,21-diacetate, 11β,17α,21-trihydroxypregn-4-ene-3,20-dione 11,21-diacetate, 15α,17α,21-trihydroxypregn-4-ene-3,20-dione 15,21-diacetate, 16β,17α,21-trihydroxypregn-4-ene-3,20-dione 16,21-diacetate, 17α,19,21-trihydroxypregn - 4 - ene-3,20-dione 19,21 - diacetate and 16α,17α-epoxy-21-hydroxypregn-4-ene-3,20-dione 21-acetate into contact with an enzyme selected from the group consisting of diastase, Takadiastase and Protamilase in an aqueous medium, whereby selective hydrolysis of the 21-acetoxy group is effected to give the corresponding 21-hydroxysteroid selected from the group consisting of 6β,17α,21 - trihydroxypregn-4 - ene - 3,20-dione 6-acetate, 11α,17α,21 - trihydroxypregn-4-ene-3,20-dione 11-acetate, 11β,17α,21-trihydroxypregn-4-ene-3,20-dione 11 - acetate, 15α,17α,21-trihydroxypregn-4-ene-3,20-dione 15 - acetate, 16β,17α,21-trihydroxypregn-4-ene-3,20-dione 16 - acetate, 17α,19,21 - trihydroxypregn-4-ene-3,20-dione 19 - acetate and 16α,17α-epoxy-21-hydroxypregn-4-ene-3,20-dione.

7. A method for the preparation of 16α,21-dihydroxypregn-4-ene-3,20-dione, which comprises subjecting 16α,21-dihydroxypregn-4-ene-3,20-dione 16,21-diacetate to the action of diastase in aqueous medium.

8. A method for the preparation of 16α,21-dihydroxypregn - 4 - ene - 3,20 - dione, which comprises subjecting 16α,21-dihydroxypregn-4-ene-3,20-dione 21-monoacetate to the action of diastase in aqueous medium.

9. A method for the preparation of 11β,17α,21-trihydroxypregn-4-ene-3,20-dione, which comprises subjecting 11β,17α,21 - trihydroxypregn-4-ene-3,20-dione 21-acetate (hydrocortison acetate) to the action of Protamilase in aqueous medium.

10. A method for the preparation of 17β-hydroxyandrost-4-en-3-one (testosterone), which comprises subjecting 17β-hydroxyandrost-4-en-3-one formate (testosterone formate) to the action of diastase in aqueous medium.

11. A method for the preparation of 15α,17α,21-trihydroxypregn-4-ene-3,20-dione 15-monoacetate, which comprises subjecting 15α,17α,21-trihydroxypregn-4-ene-3,20-dione 15,21-diacetate to the action of diastase in aqueous medium.

12. A method for the prepartion of 16β,17α,21-trihydroxypregn-4-ene-3,20-dione 16-monoacetate, which comprises subjecting 16β,17α,21-trihydroxypregn-4-ene-3,20-dione 16,21-diacetate to the action of diastase in aqueous medium.

13. A method for the preparation of 16β,17α,21-trihydroxypregn-4-ene-3,20-dione, which comprises subjecting 16β,17α,21 - trihydroxypregn-4-ene-3,20-dione 16,21 - diacetate to the action of Takadiastase in aqueous medium.

14. A method for the preparation of 11α,17α,21-trihydroxypregn-4-ene-3,20-dione 11-monoacetate, which comprises subjecting 11α,17α,21 - trihydroxypregn-ene-3,20-dione 11,21-diacetate to the action of diastase in aqueous medium.

15. A method for the preparation of 17α,19,21-trihydroxypregn-4-ene-3,20-dione 19-monoacetate, which comprises subjecting 17α,19,21 - trihydroxypregn-4-ene-3,20-dione 19,21-diacetate to the action of diastase in aqueous medium.

References Cited in the file of this patent
UNITED STATES PATENTS

| | | |
|---|---|---|
| 2,643,970 | Zaffaroni | June 30, 1953 |
| 2,676,904 | Jeanloz et al. | Apr. 27, 1954 |
| 2,812,285 | Zaffaroni et al. | Nov. 5, 1957 |
| 2,824,044 | Miescher | Feb. 18, 1958 |
| 2,833,797 | Herschberg | May 6, 1958 |
| 2,860,149 | Loken et al. | Nov. 11, 1958 |